United States Patent

[11] 3,587,308

| [72] | Inventors | James W. Tucker<br>Falls Church, Va.;<br>Thomas H. Cosden, Lothian, Md. |
|---|---|---|
| [21] | Appl. No. | 821,750 |
| [22] | Filed | May 5, 1969 |
| [45] | Patented | June 28, 1971 |
| [73] | Assignee | The United States of America as represented by the Secretary of the Navy |

[54] WATER WAVE MONITOR
6 Claims, 2 Drawing Figs.

[52] U.S. Cl. .................................................. 73/170
[51] Int. Cl. .................................................. G01f
[50] Field of Search ........................... 73/170, 170 (C), 304

[56] References Cited
UNITED STATES PATENTS

| 2,698,539 | 12/1955 | Gridel | 73/304 |
| 2,761,320 | 9/1956 | Duntley | 73/170 |
| 3,255,882 | 6/1966 | McCarty et al. | 73/304X |

Primary Examiner—Richard C. Queisser
Assistant Examiner—John P. Beauchamp
Attorneys—R. S. Sciascia, A. L. Branning and M. L. Crane ABSTRACT: A device for measuring waveheights from less than one-tenth of an inch to many feet by the use of a single thin wire probe. Waveheight is determined by the conductance between the thin wire and the body of water which is proportional to the length of wire immersed and therefore to the instantaneous waveheight.

PATENTED JUN 28 1971 3,587,308

INVENTORS
JAMES W. TUCKER
THOMAS H. COSDEN

BY Melvin L. Crane AGENT

ATTORNEY 3,587,308

WATER WAVE MONITOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is directed to a water wave monitor and more specifically to a wave monitor that uses one thin wire.

Heretofore, various devices have been used to measure waveheight or water depth by measuring pressure, acceleration or conductivity. Prior conductivity devices made use of parallel conductors in which the resistance measurement varies as the fluid level varies. In such a conductivity system care must be taken to prevent relative movement of the wires to avoid incorrect measurement. The wires used must have substantial cross sections, therefore, small capillary waves cannot be accurately measured. Prior conductivity devices using two conductors affect the wave slope and are sensitive to wave direction. Such prior art devices do not present an accurate measurement of waveheight.

SUMMARY OF THE INVENTION

The present invention overcomes the drawbacks of prior art wave monitors by providing a simple system which least affects wave slope and which is not sensitive to wave direction. The device makes use of only one wire that extends from the water in the area of concern; therefore, the water is least affected by the one wire. A second electrode which may be a weight that holds the first wire taut against an upper wire holder keeps the wire in an upright position and in place. The use of the totally immersed second electrode eliminates the effect of waves at the second electrode.

STATEMENT OF THE OBJECTS

It is therefore an object of the invention to provide a simple, easily constructed water wave monitor.

Another object is to provide a wave monitor which is operative to monitor waves ranging from a height of less than one-tenth of an inch to a number of feet in height.

Still another object is to provide a wave monitor which is not influenced by wave direction and minimizes the influence of wave slope.

Yet another object is to provide a wave monitor which is easily calibrated for waters of different conductivity.

Another object is to provide a monitor of low electrical capacity or inertia which can therefore respond to wave frequency components at least up to 100 Hertzians.

Another object is to provide a water wave monitor that can be used with tape or chart recorders, wave analyzers, and other conventional electronic instrumentation.

Other objects and advantages of the invention will hereinafter become more fully apparent from the description of the drawings.

DESCRIPTION OF THE DRAWING

Figures 1, 2:
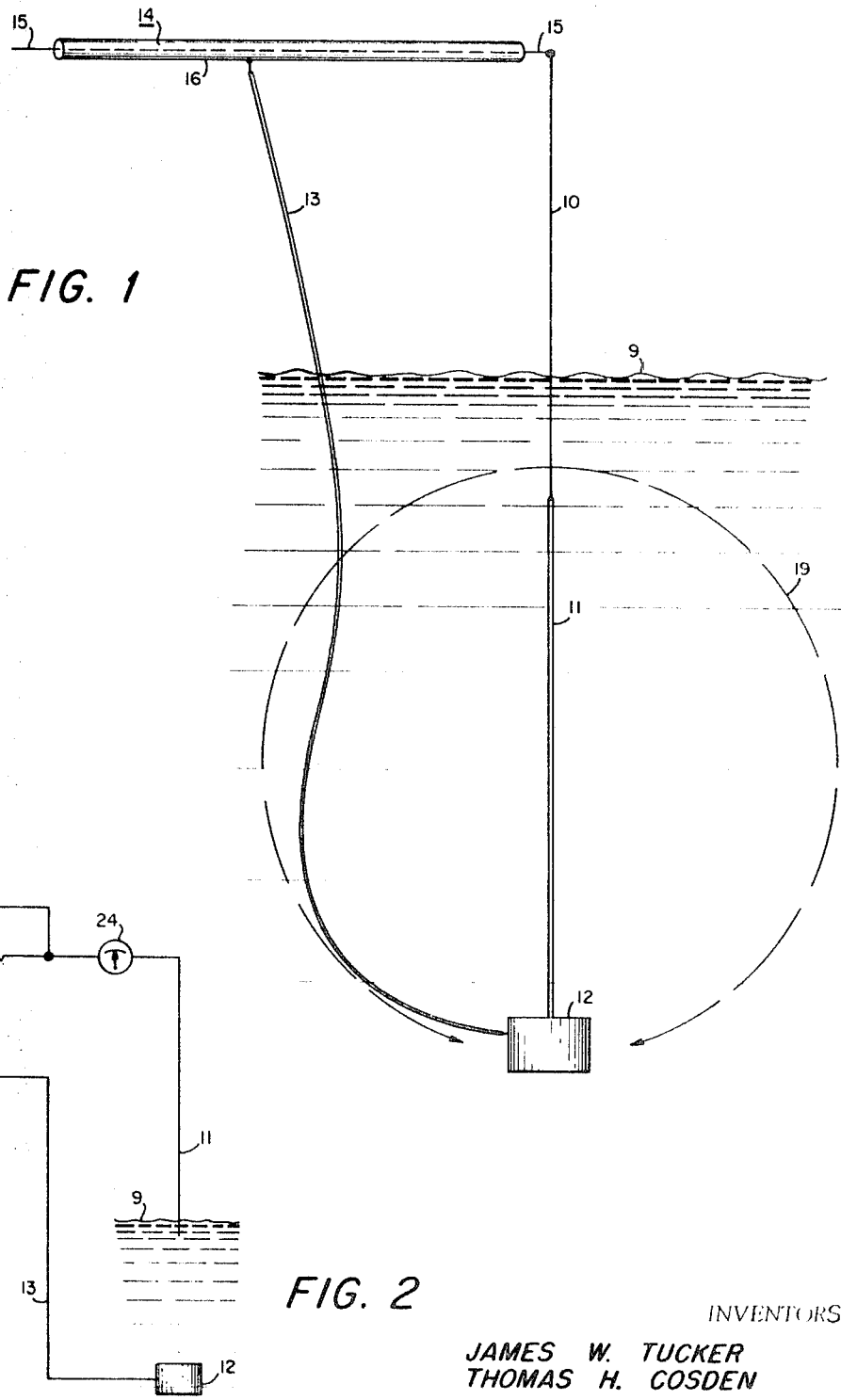
FIG. 1 illustrates a fine wire wave monitor exclusive of the electrical circuitry.
FIG. 2 illustrates an electrical circuitry which may be used in conjunction with the water wave monitor.

Now referring to the drawing, there is shown by illustration a wave monitoring system according to the teaching of the present invention. As shown, the wave monitor includes a thin conductive wire 10 having a small cross section and supported at the upper end by any suitable means from which it is electrically insulated. The wire has a length such that the lower end extends below the surface of the water to be measured and the upper end extends upwardly sufficient to extend above the highest wave to be measured. The upper end of the thin wire is supported by a boom or any other device in the case of a test chamber or when supported by a ship. In open water use, the wire may be supported by an anchored or free floating buoy. A long spar buoy would be relatively unaffected by surface waves and would provide a relatively fixed reference elevation for monitoring waves in a nonattended area.

The end of the thin wire that extends into the water 9 is connected with a line 11 which supports a weight 12 that holds the wire in a straight line in a taut condition. The line 11 may be of a nonconductive material or of a conductive material which is insulated from the end of the thin wire to which it is connected as well as being insulated from the water. A second or ground electrode is needed in the water; therefore, the weight 12 may be of a conductive material such as brass and serve as the ground electrode. In use as the ground electrode, the brass weight must be insulated from the support line if the support line is made of a conductive material. The second or ground electrode should have an area exposed to the water which is much larger than that of the thin wire and the distance from the lower end of the thin wire should be several times the maximum immersed length of the wire. Since the ground or second electrode is spaced from and insulated from the thin wire all current flow designated by dotted line 19 will flow between that portion of the thin wire under the water and the second or ground electrode. In order to have an even flow of current from the wire to the ground electrode, the weight should be symmetrical. An insulated electrical line 13 is connected with the ground electrode supported from the thin wire and brought out to an electrical circuit which is used to monitor the waves. A shielded cable 14 may be used to connect the center conductor 15 electrically to the upper end of the thin wire and the wire 13 connected with the second electrode may connect electrically with the outer shield 16 of the cable. The cable is then connected into an electrical circuit such as shown in FIG. 2.

It is well known that fresh water, river water and sea water have a different conductivity, therefore, either of two circuits as described below and shown in FIG. 2 may be used to monitor the waves. The circuit includes a voltage source 21 which may be either a direct or alternating current type with a variable resistor 22 in series with the thin wire 10 and the ground electrode 12. A suitable monitor indicator 23 such as a voltmeter may be connected across the voltage source and resistor to determine the voltage change and an ammeter 24 may be connected in the line to determine the current flow between the thin wire and the ground electrode. The terms voltmeter and ammeter shall be understood to include any suitable electronic systems actuated by the signal voltage or signal current indicated by the meter positions and their connections within the circuit. Such electronic systems may include amplifiers, filters, wave analyzers, chart or tape recorders, etc.

If the water conductivity is high, the value of the resistor 22 must be large compared to the resistance between the end of the thin wire in the water and the ground electrode to provide a substantially constant current source, since the resistors are in series and resistor 22 is large compared to the resistance of the water about the wire being measured, any change in the much smaller resistance value due to water height will have a negligible change on the current. However, any change in the resistance about the wire due to the water will have a corresponding change in the voltage drop across the resistance of the water between the end of the line and the ground electrode 12. Since there is negligible change in current, the voltage drop across the resistor 22 will be approximately the same whereas the voltage drop due to the resistance of the water from the end of the wire to the ground electrode will be relatively large as the resistance changes, thereby the voltage between the thin wire and the ground electrode is monitored. Therefore, a voltmeter or other suitable equipment actuated by the signal voltage is connected across the lines to determine the voltage change which is representative of the waveheight.

If the conductivity of the water is low, a constant voltage is maintained; therefore, the value of the resistor 22 is small compared to the resistance between the end of the thin wire in the water and the ground electrode. Since the water conductivity is low, a large resistance to current flow exist so that small changes in water height will produce large changes in resistance. Since the voltage is constant and large changes in resistance takes place, the change in current flow will be large. Thus, the current flow in the circuit is monitored by any suitable equipment to give a measure of the height of the waves on the thin wire electrode.

Since the circuit for measuring voltage change or current change for monitoring waveheight is the same except for the value of the resistor 22, the resistor 22 may be a variable resistor so that one circuit may be made for either case. If the resistor 22 is a constant resistance type then different circuits would be required for water of different conductivity. Therefore, use of a variable resistance resistor would provide a universal circuit for use in any type of water.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

We claim:

1. A water wave monitor for determining the waveheight of water in the vicinity of the monitor; which comprises:
   a thin elongated wire electrode having a noninsulated portion along its length,
   said thin wire electrode adapted to be suspended with a portion of the noninsulated portion exposed to the water to be monitored,
   a second electrode,
   said second electrode being large compared to said wire electrode and exposed to the water when in use,
   a suspension means connected between the end of said wire electrode exposed to the water to be monitored and said second electrode to suspend said second electrode in the water below said thin wire electrode in spaced relationship, and
   an electrical means for measuring conductance between said thin wire and the water to be monitored whereby the conductance is proportional to the length of the wire exposed to the water and thereby a measure of waveheight.

2. A wave monitor as claimed in claim 1, wherein:
   said electrical means includes a resistor which is large compared to the conductivity of the water being monitored.

3. A wave monitor as claimed in claim 1, wherein:
   said electrical means includes a resistor which is much less than the conductivity of the water being monitored.

4. A water wave monitor as claimed in claim 1 which includes:
   means for supporting said thin elongated wire such that the lower end of said noninsulated portion extends into the water to be monitored and the length of said noninsulated portion of said wire is sufficient such that the noninsulated portion extends above the highest wave to be monitored.

5. A water wave monitor as claimed in claim 4, wherein:
   said second electrode is suspended below said thin wire electrode a distance which is much greater than the highest wave to be monitored.

6. A water wave monitor as claimed in claim 5, wherein:
   said second electrode is a symmetrical weight made of a conductive material.